(12) United States Patent
Chuang (10) Patent No.: US 11,261,936 B2
(45) Date of Patent: Mar. 1, 2022

(54) CHAIN MASTER LINK TOOL

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 282 days.

(21) Appl. No.: 16/686,350

(22) Filed: Nov. 18, 2019

(65) Prior Publication Data

US 2020/0191240 A1 Jun. 18, 2020

(30) Foreign Application Priority Data

Dec. 17, 2018 (TW) .................................. 107145499

(51) Int. Cl.
*F16G 3/00* (2006.01)
*B25F 1/00* (2006.01)
*B25B 27/22* (2006.01)

(52) U.S. Cl.
CPC .............. *F16G 3/006* (2013.01); *B25B 27/22* (2013.01); *B25F 1/003* (2013.01)

(58) Field of Classification Search
CPC .. B25B 27/22; B25B 7/02; B25B 7/08; B25B 7/22; B25B 27/0071; B25G 1/08; B25F 1/003; F16G 3/006
USPC ............................................................ 7/127
See application file for complete search history.

(56) References Cited

U.S. PATENT DOCUMENTS

| 10,408,301 B2 | 9/2019 | Lauer | |
| 2021/0245340 A1* | 8/2021 | Ichikawa | .................. B25F 1/04 |

FOREIGN PATENT DOCUMENTS

| CN | 101920487 A | 12/2010 |
| TW | M536595 U | 2/2017 |
| TW | M546272 U | 8/2017 |
| TW | M549279 U | 9/2017 |

* cited by examiner

*Primary Examiner* — David B. Thomas
*Assistant Examiner* — Thomas Raymond Rodgers
(74) *Attorney, Agent, or Firm* — Alan D. Kamrath; Karin L. Williams; Mayer & Williams PC (57) ABSTRACT

A chain master link tool includes a first lever and a second lever pivotally and releasably coupled together. Each of the first and second levers include a first working portions and a second working portion. The first and second levers are pivotal to an extended position in which the first working portions face oppositely and are disposed apart and cooperatively delimit a connection space therebetween for connection of a master link with a roller chain assembly and the second working portions face oppositely and are disposed apart and cooperatively delimit a removal space therebetween for removal of the master link from the roller chain assembly respectively.

11 Claims, 14 Drawing Sheets

CHAIN MASTER LINK TOOL

BACKGROUND OF THE INVENTION

1. Field of the Invention

The present invention relates to a chain master link tool and, particularly, to a master link tool that facilitates removal and connection of master links.

2. Description of the Related Art

A roller chain assembly is made up of a series of interlinking and alternating outer and inner plates. A master link works by replacing the outer plates of a single outer link of the chain. The method of replacing a single outer link with a master link includes using a chain breaker to remove the outer plates of the single outer link and using a master link pliers to apply force to pull two opposing links of the master link from an unlocked position into a locked position.

Since a chain breaker and a master link pliers are not cheap and preparing them can cause inconvenience, the present invention is, therefore, intended to obviate or at least alleviate the problems encountered in the prior art.

SUMMARY OF THE INVENTION

According to the present invention, a chain master link tool includes a first lever and a second lever pivotally and releasably coupled together. Each of the first and second levers include a first working portion and a second working portion. The first and second levers are pivotal to an extended position in which the first working portions face oppositely and are disposed apart and cooperatively delimit a connection space therebetween for connection of a master link with a roller chain assembly and the second working portions face oppositely and are disposed apart and cooperatively delimit a removal space therebetween for removal of the master link from the roller chain assembly respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
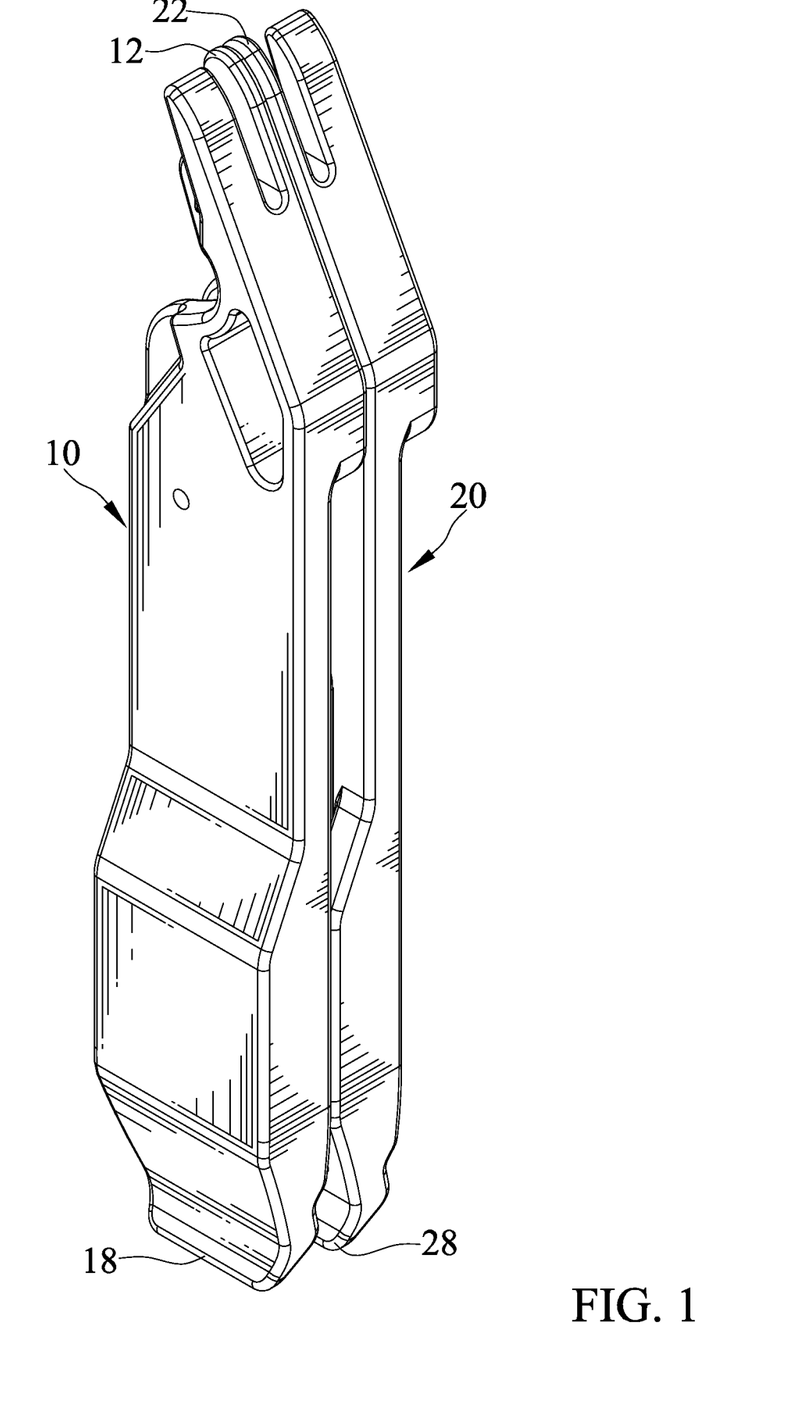
FIG. 1 is a perspective view illustrating a chain master link tool in accordance with the present invention in a stowed position.
Figure 2:
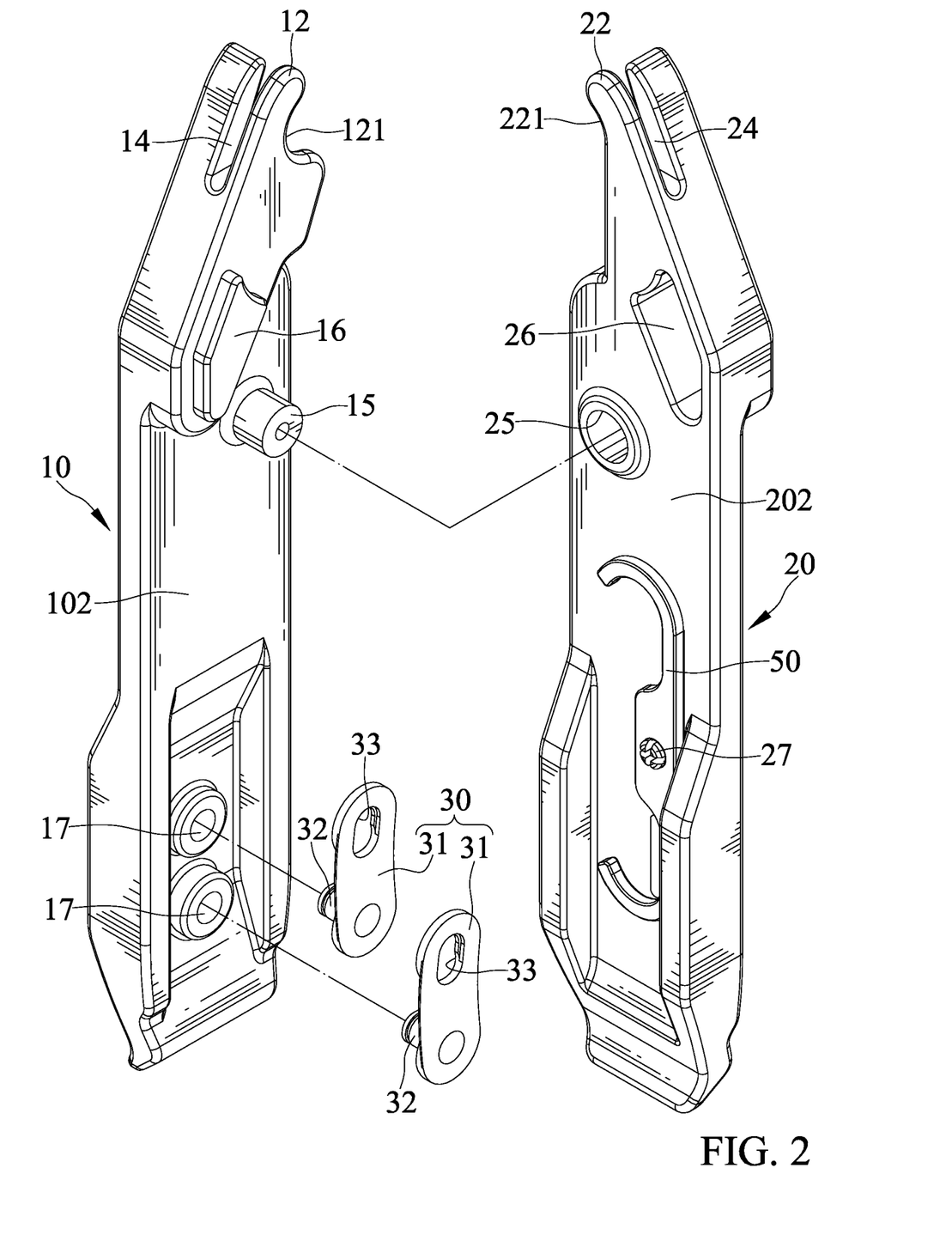
FIG. 2 is an exploded perspective view of the chain master link tool.
Figure 3:
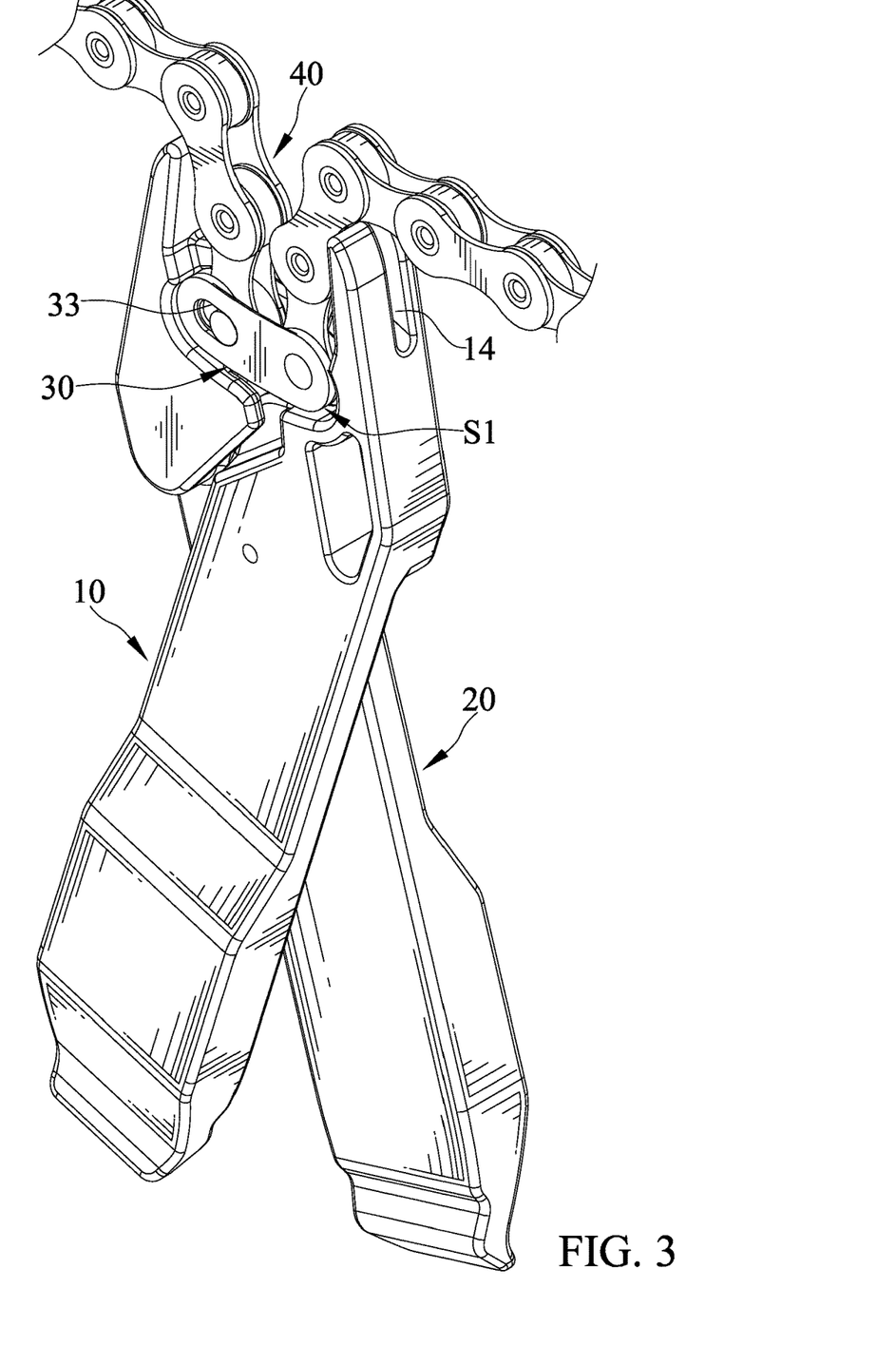
FIG. 3 is a perspective view illustrating the chain master link tool in a use position for connection of a master link with a roller chain assembly, with the master link held in a connection space of the chain master link tool, and with the master link in an unlocked position.
Figure 4:
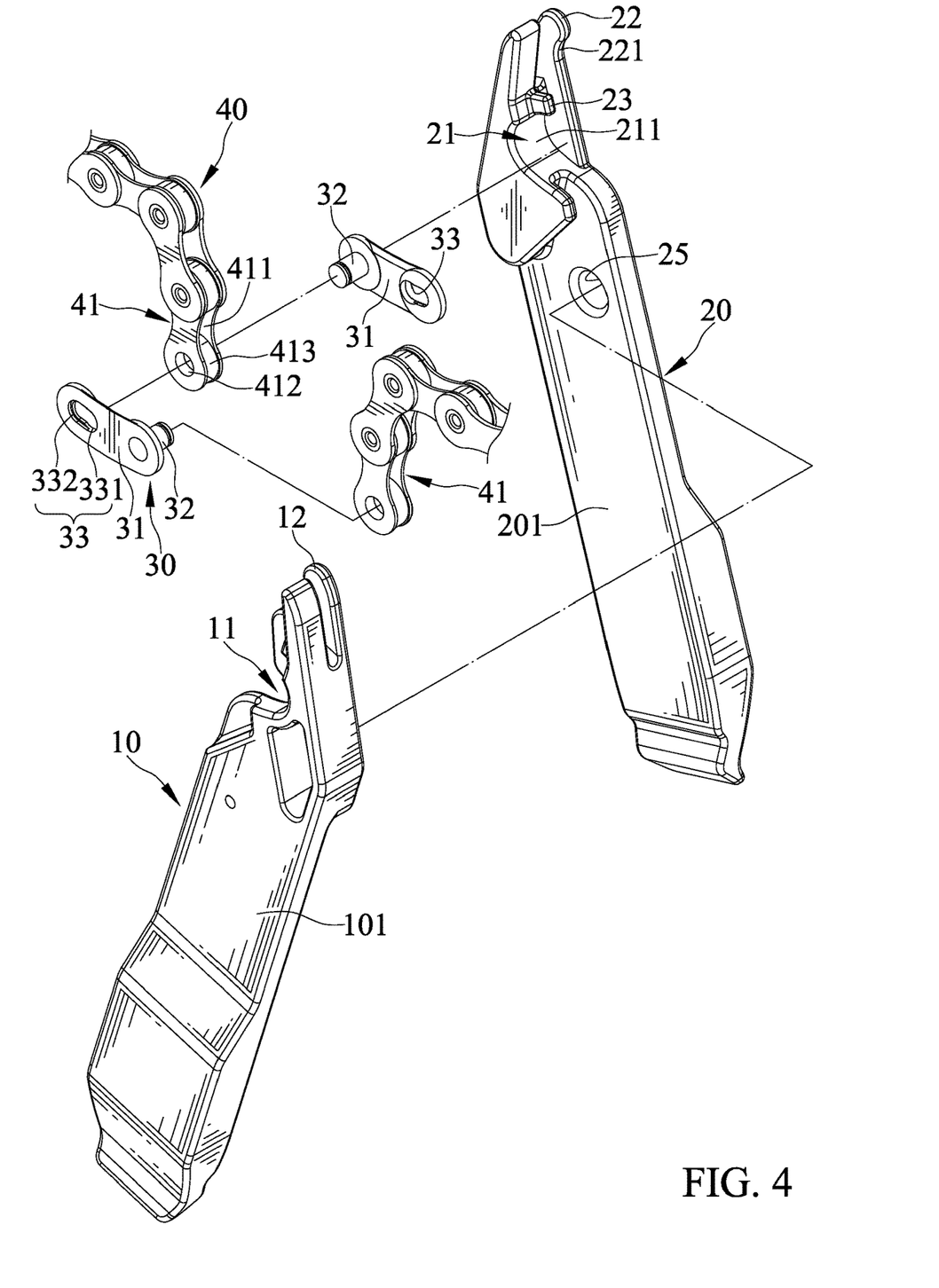
FIG. 4 is an exploded perspective view of FIG. 3.
Figure 5:
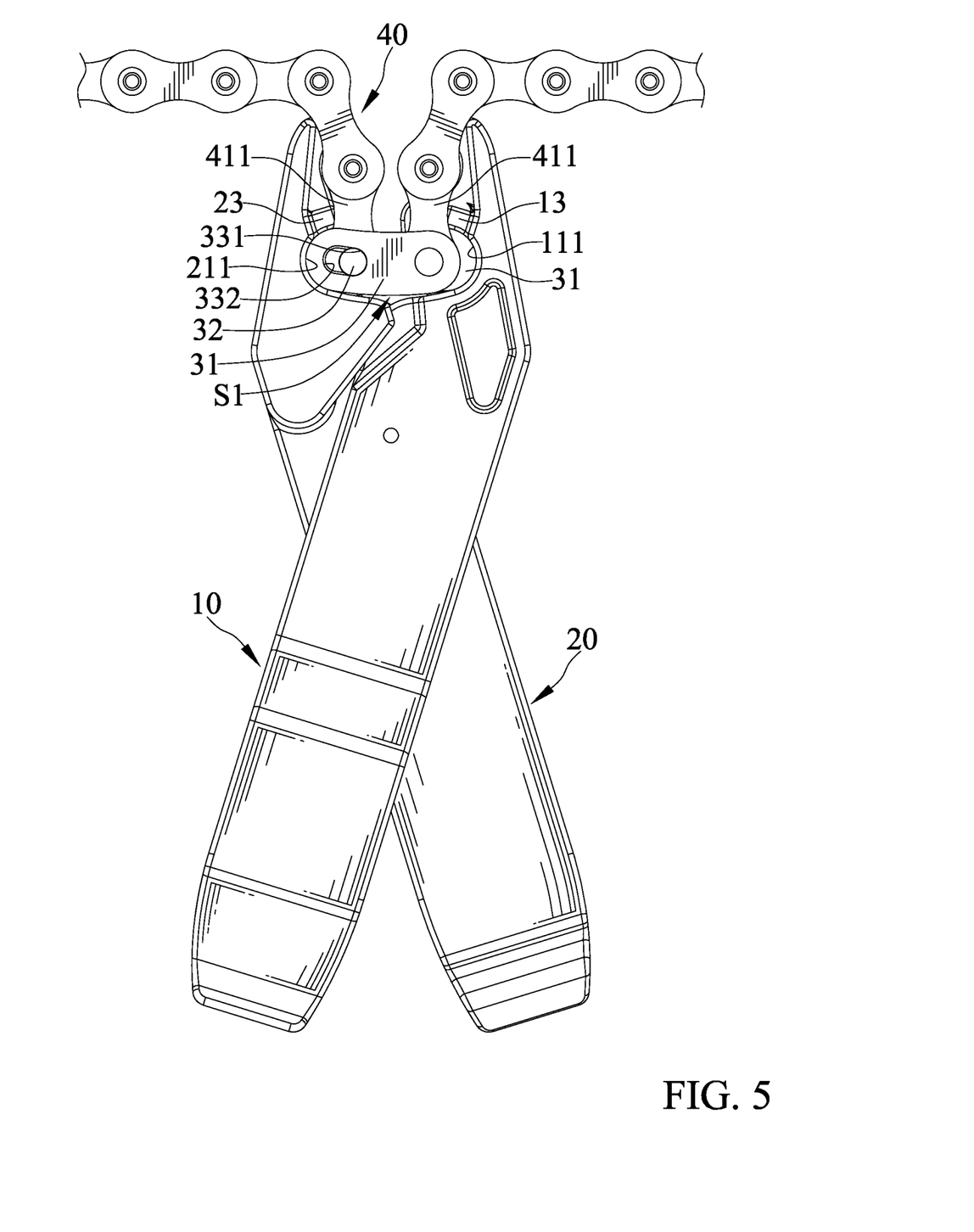
FIG. 5 is a front view of FIG. 3.
Figure 6:
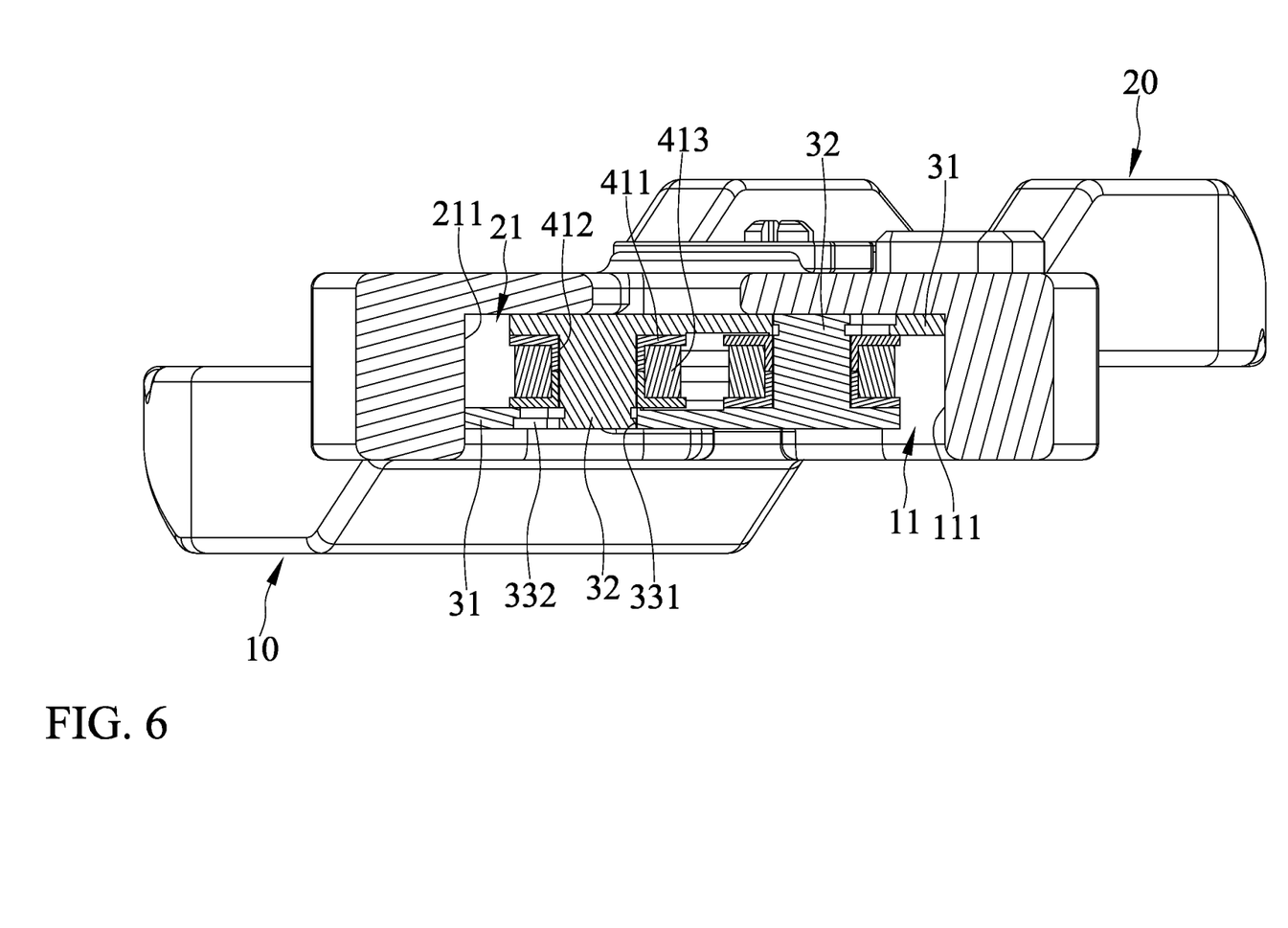
FIG. 6 is a cross-sectional view of FIG. 3.
Figure 7:
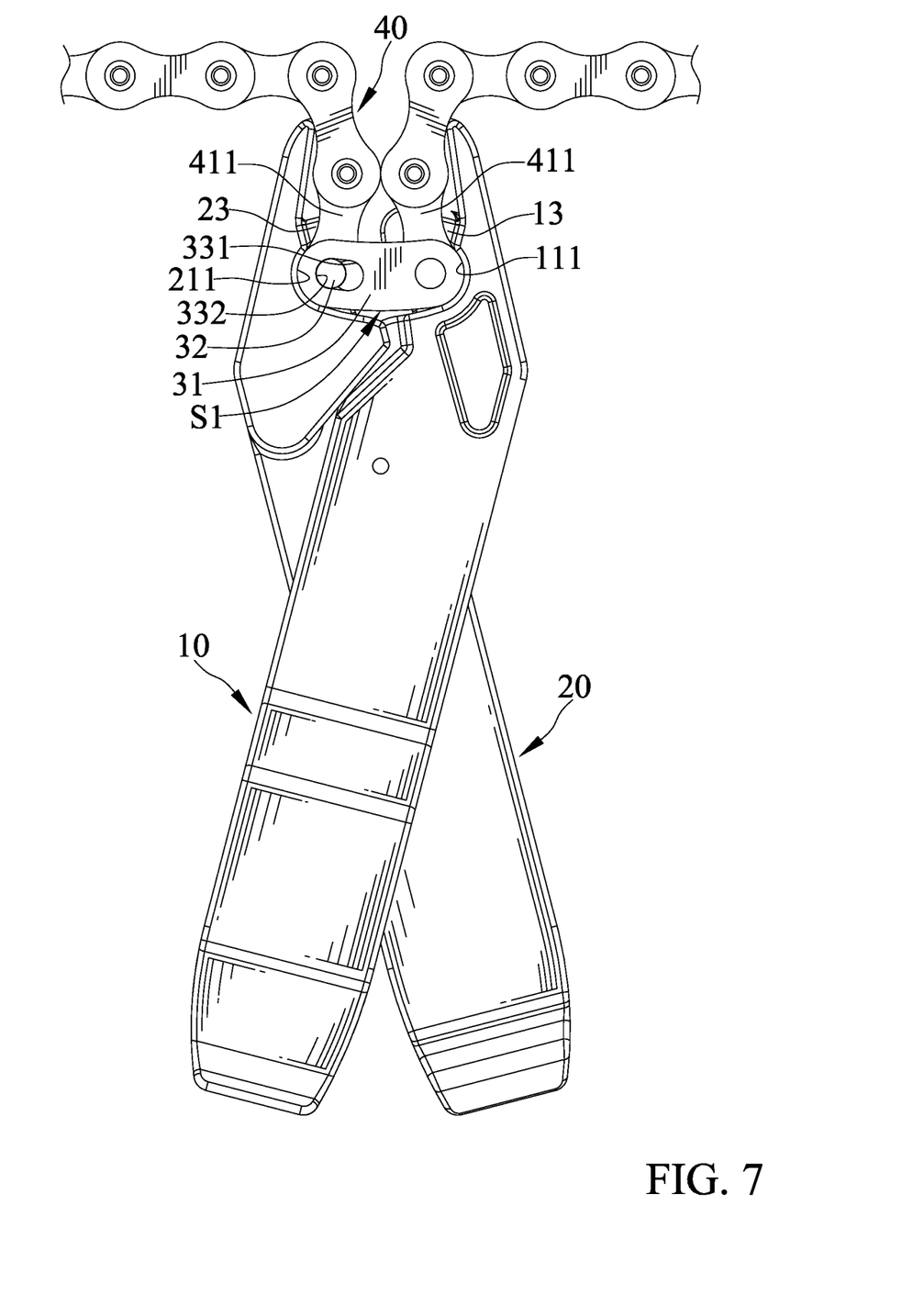
FIG. 7 is a front view illustrating the master link held in the connection space shifted to a locked position by the chain master link tool.
Figure 8:
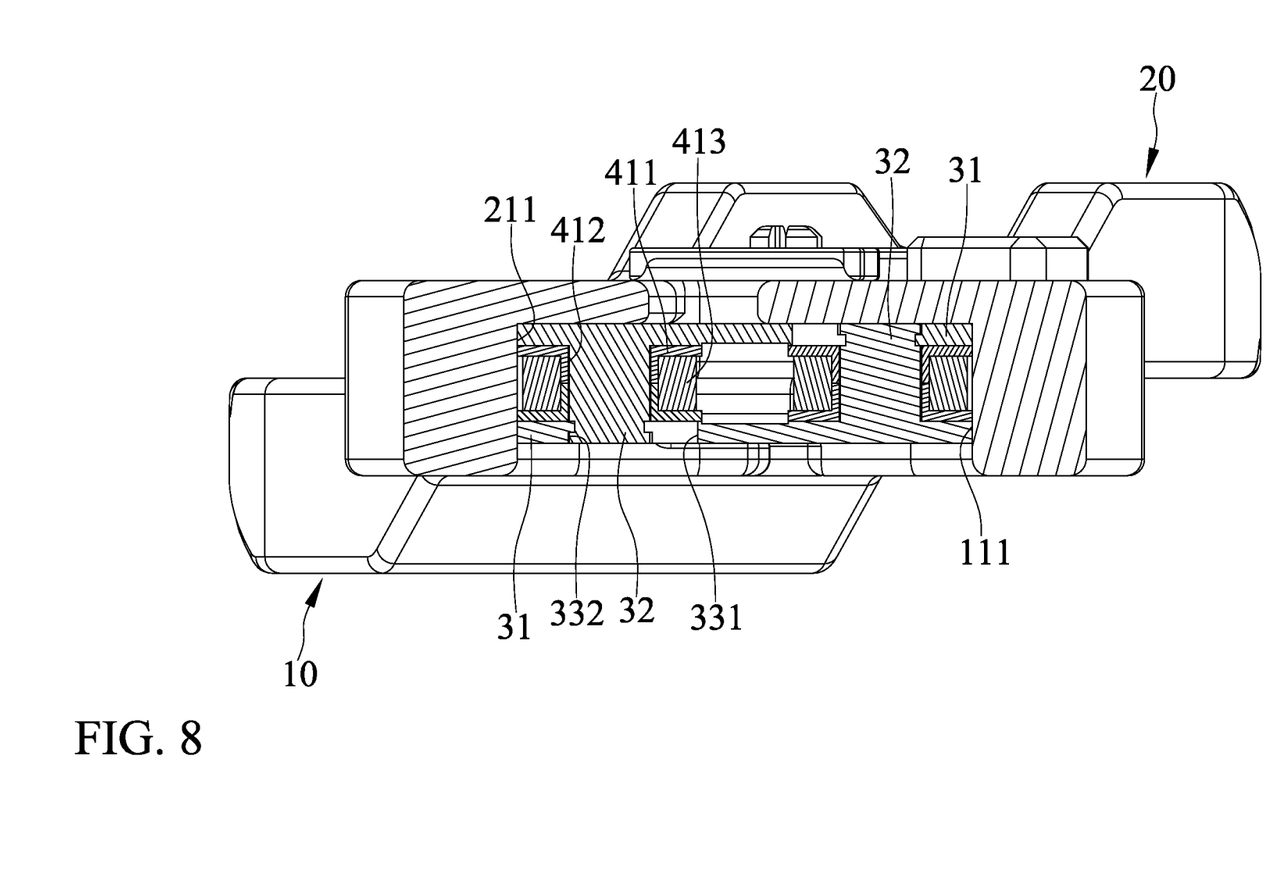
FIG. 8 is a cross-sectional view of FIG. 7.
Figure 9:
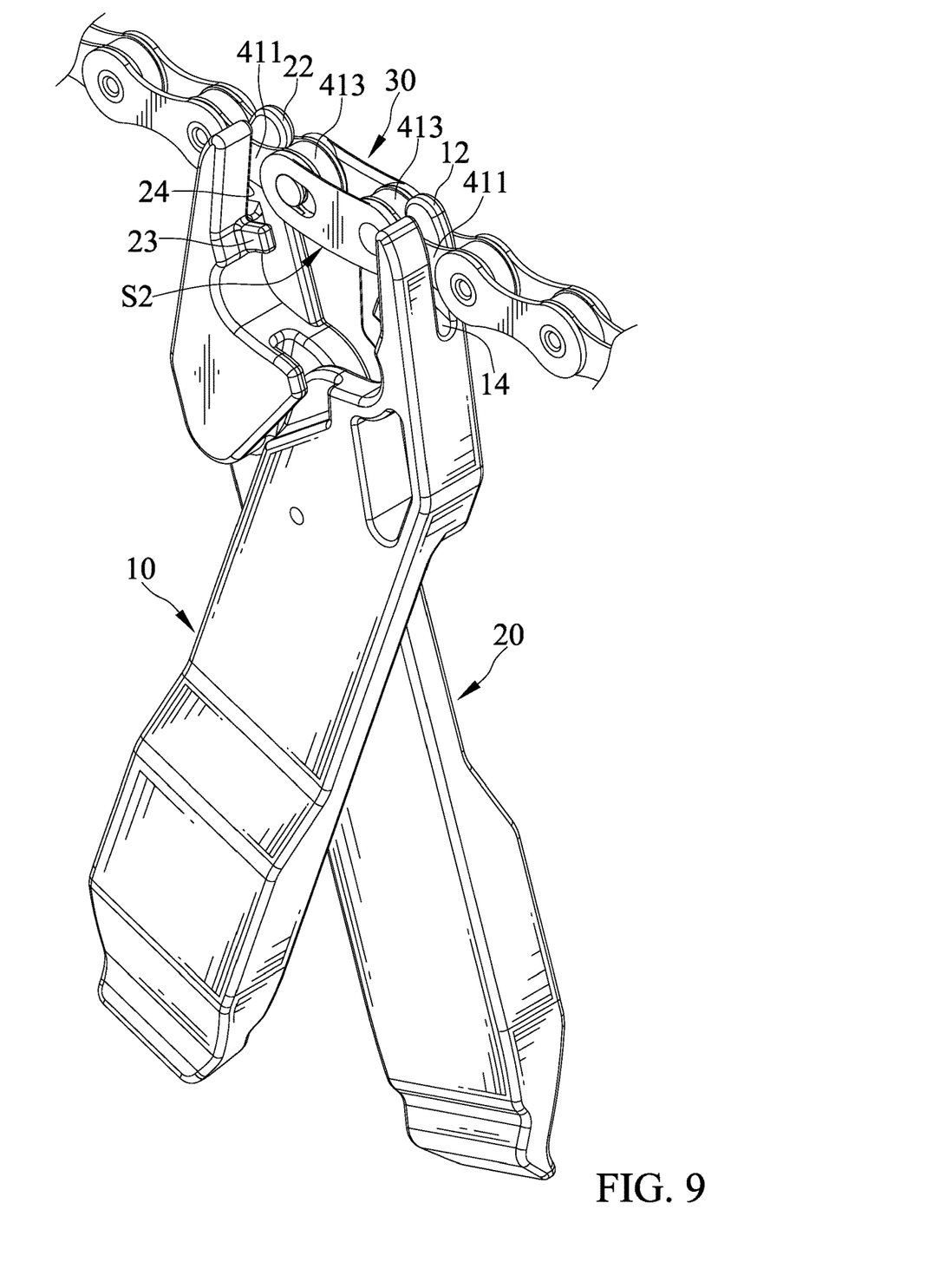
FIG. 9 is perspective view illustrating the master link held in a removal space of the chain master link tool and in the locked position.
Figure 10:
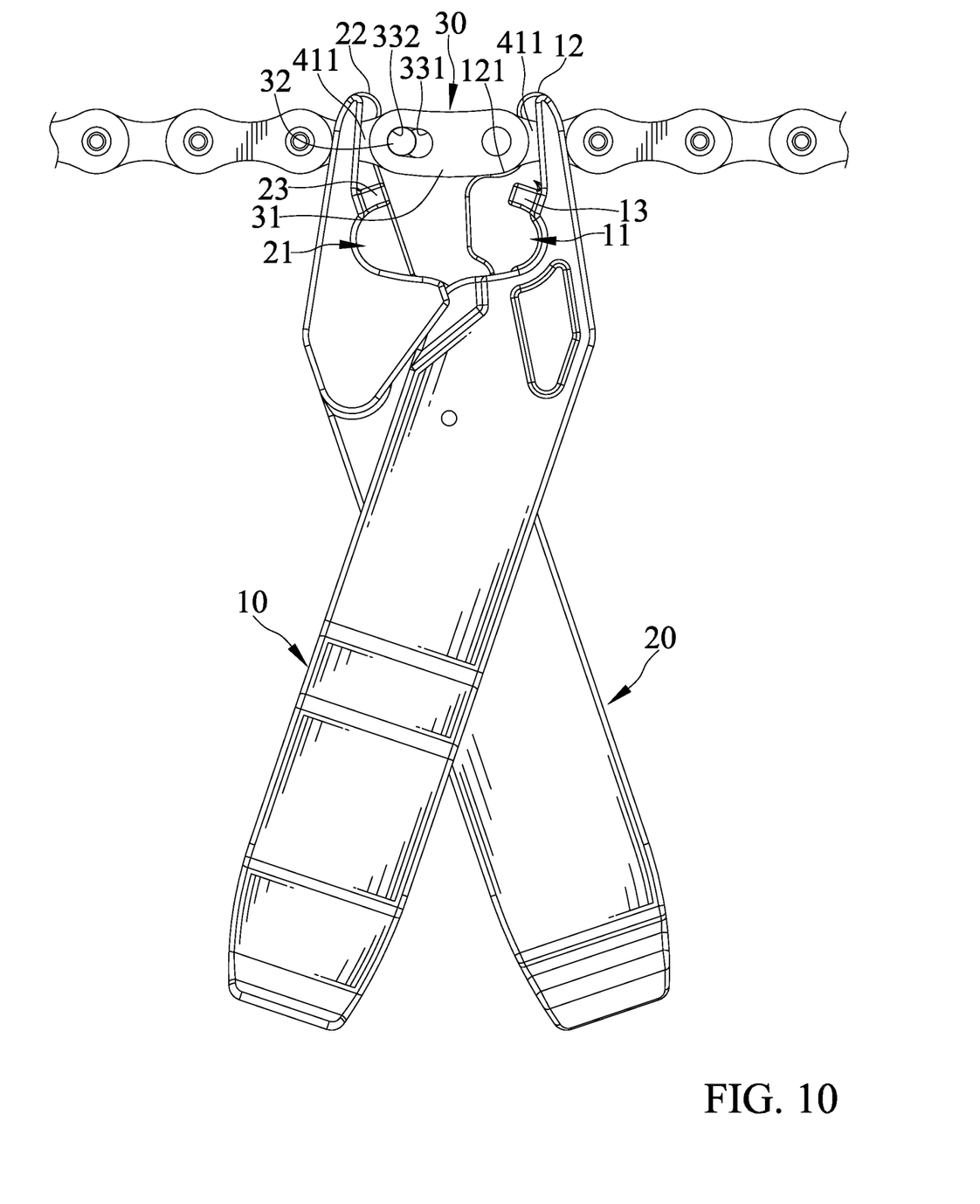
FIG. 10 is front view of FIG. 9.
Figure 11:
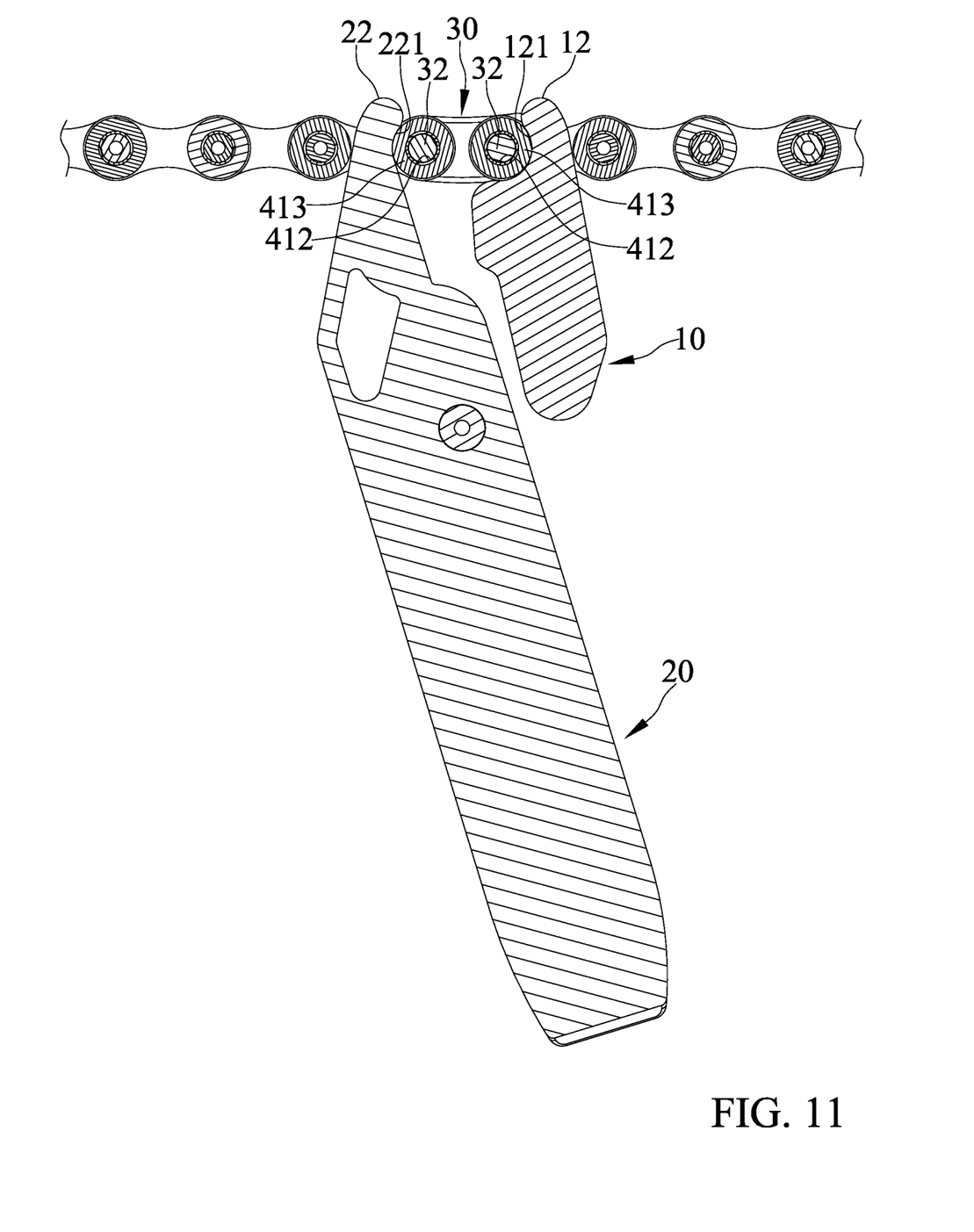
FIG. 11 is a cross-sectional view of FIG. 9.
Figure 12:
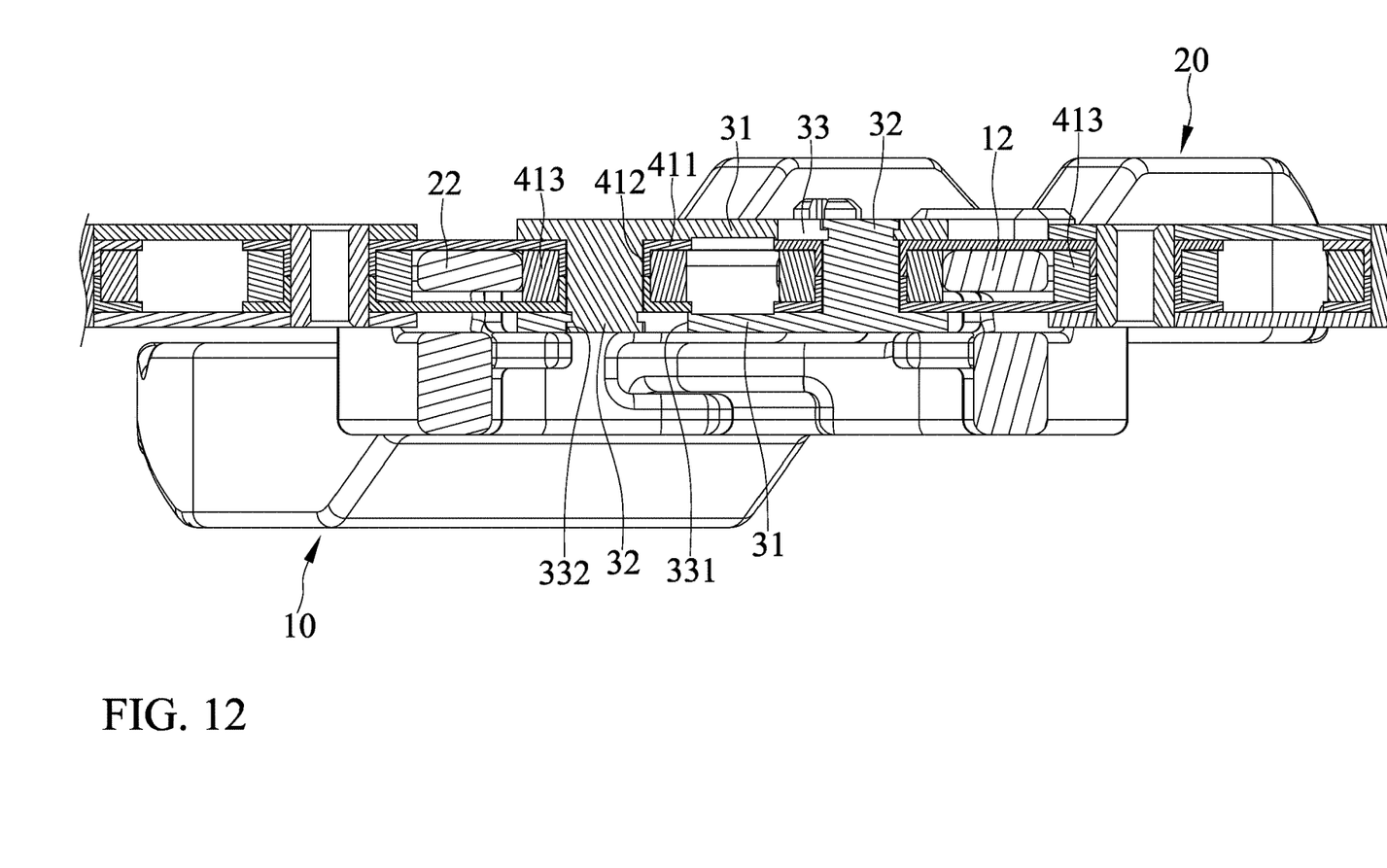
FIG. 12 is another cross-sectional view of FIG. 9.
Figure 13:
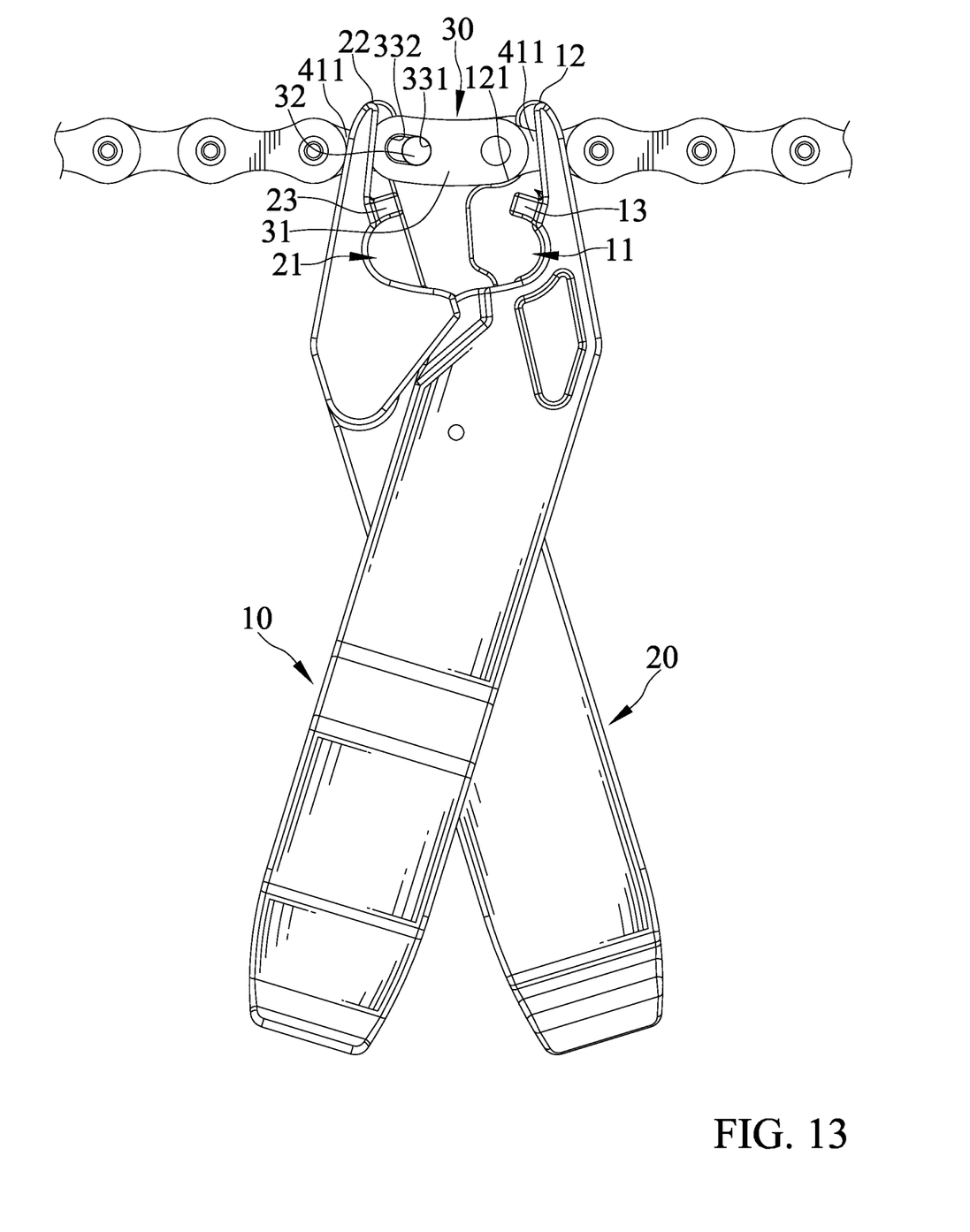
FIG. 13 is a front view illustrating the master link shifted to the unlocked position by the chain master link tool.
Figure 14:
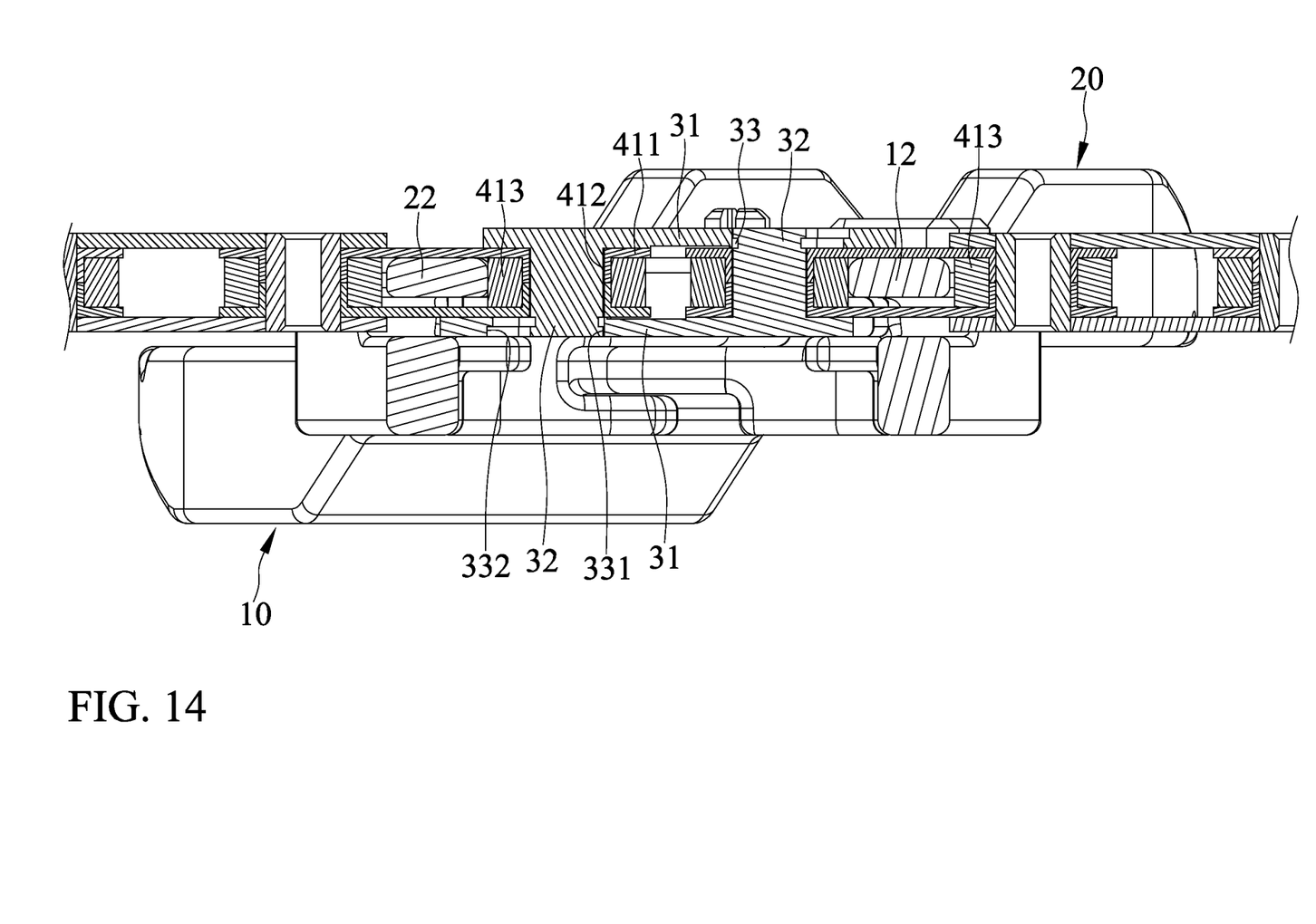
FIG. 14 is a cross-sectional view of FIG. 13.

FIG. 1 shows a chain master link tool in accordance with the present invention including a lever 10 and a lever 20 pivotally and releasably coupled together. Each of the levers 10 and 20 has a front side 101 and 201 and a back side 102 and 202 and includes a connecting portion 15 and 25 on the back side 102 and 202. The connecting portions 15 and 25 of the levers 10 and 20 are pivotally engaged with each other releasably. The connection portion 15 defines a protrusion and the connection portion 25 defines a hole respectively, and the protrusion is pivotally engaged in the hole. Each of the levers 10 and 20 includes a working portions 11 and 21 and a working portion 12 and 22.

The levers 10 and 20 are pivotal to an extended position in which the working portions 11 and 21 face oppositely and are disposed apart and cooperatively delimit a connection space S1 therebetween for connection of a master link 30 with a roller chain assembly 40 and the working portions 12 and 22 face oppositely and are disposed apart and cooperatively delimit a removal space S2 therebetween for removal of the master link 30 from the roller chain assembly 40. Each of the levers 10 and 20 has an inner peripheral wall 111 and 211 delimiting the connection space S1 and an inner peripheral wall 121 and 221 delimiting the removal space S2 respectively. The inner peripheral wall 121 is more prominent than the inner peripheral wall 111. The inner peripheral walls 221 is more prominent than the inner peripheral walls 211. The inner peripheral walls 111 and 211 are concaved. When the chain master link tool is in use, the levers 10 and 20 are pivoted to the extended position. The levers 10 and 20 are crisscrossed in the shape of an X.

The levers 10 and 20 are pivotal to a collapsed position in which the working portions 11 and 21 are adjacent to each other, the working portions 12 and 22 are adjacent to each other, and the working portions 11, 21, 12, and 22 orientate in a same direction. When the chain master link tool is in a stowed position, as shown in FIG. 1, the levers 10 and 20 are pivoted to the collapsed position.

Each of the levers 10 and 20 includes a stopping portion 13 and 23. The stopping portion 13 is disposed at a height between heights of the working portions 11 and 12. The stopping portion 23 is disposed at a height between heights of the working portions 21 and 22. The stopping portions 13 and 23 cooperatively delimit a portion of a boundary of the connection space S1. The stopping portion 13 is a protrusion protruding from the inner peripheral wall of the lever 10. The stopping portion 23 is a protrusion protruding from the inner peripheral wall of the lever 20. When the master link 30 is held in the connection space S1, it is also limited by the stopping portions 13 and 23.

Each of the levers 10 and 20 includes a limiting portion 16 and 26 selectively engagable and disengagable from each other. When the levers 10 and 20 pivot with respect to each other, the limiting portions 16 and 26 disengage from each other. When the levers 10 and 20 are inhibited from pivoting with each other, the limiting portions 16 and 26 engage with each other releasably. When the levers 10 and 20 are pivoted to the collapsed position, the limiting portions 16 and 26 engage with each other releasably. The limiting portion 16 is in a form of a protrusion and the limiting portion 26 is in a form of a recess.

The lever 10 includes two receiving portions 17 for receiving the master link 30. The master link 30 includes a pair of plates 31. Each plate 31 includes a pin 32 protruding therefrom and an installation slot 33 extending therethrough. When the master link 30 is dissembled, the plates 31 are not connected with each other. When the master link 30 is assembled, the plates 31 are connected with each other. The master link 30 received by the two receiving portions 17 includes one pin 32 inserted in one of the two receiving portions 17 and another pin 32 inserted in the other of the two receiving portions 17.

The lever 10 has an end shaped like a chisel and defining a tire lever end 18 for removing a tire from a rim. The lever 20 has an end shaped like a chisel and defining a tire levering portion 28 for removing a tire from a rim.

The master link 30 connecting with the roller chain assembly 40 interconnects two inner links 41. Each inner link 41 includes a hollow bush 412 and a hollow roller 413 disposed between the pair of plates 411, and the bush 412 inserts through roller 413. The master link 30 includes the pin 32 on one of the pair of plates 31 inserting through the bush 412 of one inner link 41 and movably engaged in the installation slot 33 in the other of the pair of plates 31, and the pin 32 on the other of the pair of plates 31 inserting through a bush 412 of another inner link 41 and movably engaged in the installation slot 33 in one of the pair of plates 31. The master link 30 is movable between an unlocked position in which the pins 32 are disposed at ends 331 of the installation slots 33 and a locked position the pins 32 are disposed at ends 332 of the installation slots 33. The master link 30 connects with the roller chain assembly 40 in a releasable state when it is at the unlocked position, and in a secured state when it is moved to the locked position.

FIGS. 3 through 8 illustrate the chain master link tool is used to facilitate connection of the master link 30 with the roller chain assembly 40. After the master link 30 is held in the connection space S1, it can be moved from the unlocked position to the locked position, thereby securing the master link 30 with the roller chain assembly 40. Further, the inner peripheral wall 111 of the lever 10 abuts against a convex end of one of the pair of plates 31 and the inner peripheral wall 211 of the lever 20 abuts against a convex end of the other of the pair of plates 31 respectively. By pivoting the lever 10 with respect to the lever 20 to move the inner peripheral walls 111 and 211 toward each other, the master link 30 is moved from the unlocked position to the locked position.

FIG. 9 through 14 illustrate the chain master link tool is used to facilitate removal of the master link 30 from the roller chain assembly 40. After the master link 30 is held in the removal space S2, it can be moved from the locked position to the unlocked position, thereby allowing the master link 30 to connect with the roller chain assembly 40 in the releasable state and disengage from it afterwards. Further, the inner peripheral wall 121 of the lever 10 abuts against the roller 413 of one inner link 41 and the inner peripheral wall 221 of the lever 20 abuts against the roller 413 of another inner link 41 respectively. By pivoting the lever 10 with respect to the lever 20 to move the inner peripheral walls 121 and 221 toward each other, the master link 30 is moved from the locked position to the unlocked position.

When the master link 30 is held in the removal space S2, the working portion 12 includes a gap 14 adjacent thereto for receiving one of a pair of plates 411 of an inner link 41 of the roller chain assembly 40, and the working portion 22 includes a gap 24 adjacent thereto for receiving one of a pair of plates 411 of another inner link 41 of the roller chain assembly 40.

The lever 20 includes a retaining portion 27 for receiving a chain link 50. The chain link 50 is configured to facilitate connection of the master link 30 with the roller chain assembly 40 by hooking two separate links of the roller chain assembly 40, so that it's convenient and orderly to cut and connect the roller chain assembly 40. The chain link 50 is movable between a use position and a stowed position. The chain link 50 in the use position is disengaged from the retaining portion 27. The chain link 50 in the stowed position is engaged with the retaining portion 27 releasably.

In view of the foregoing, the chain master link tool is useful for connection and removal of the master link 30. The chain master link tool includes the connection space S1 for connection of the master link 30 with the roller chain assembly 40 and the removal space S2 for removal of the master link 30 from the roller chain assembly 40.

The foregoing is merely illustrative of the principles of this invention, and various modifications can be made by those skilled in the art without departing from the scope and spirit of the invention.

What is claimed is:

1. A chain master link tool comprising: a first lever and a second lever pivotally and releasably coupled together, wherein each of the first and second levers includes a first working portions and a second working portion, and wherein the first and second levers are pivotal to an extended position in which the first working portions face oppositely and are disposed apart and cooperatively delimit a connection space therebetween for connection of a master link with a roller chain assembly and the second working portions face oppositely and are disposed apart and cooperatively delimit a removal space therebetween for removal of the master link from the roller chain assembly respectively;

wherein when the master link is held in the removal space, the second working portion of the first lever includes a first gap adjacent thereto for receiving one of a pair of plates of an inner link of the roller chain assembly, and the second working portion of the second lever includes a second gap adjacent thereto for receiving one of a pair of plates of another inner link of the roller chain assembly;

wherein each of the first and second levers has a first inner peripheral wall delimiting the connection space and a second inner peripheral wall delimiting the removal space respectively, wherein the first lever includes the second inner peripheral wall more prominent than the first peripheral walls, and wherein the second lever includes the second inner peripheral wall more prominent than the first peripheral walls.

2. The chain master link tool as claimed in claim 1, wherein each of the first and second levers includes a stopping portion, wherein the stopping portion of the first lever is disposed at a height between heights of the first and second working portions of the first lever, wherein the stopping portion of the second lever is disposed at a height between heights of the first and second working portions of the second lever, and wherein the stopping portions of the first and second levers cooperatively delimit a portion of a boundary of the connection space.

3. The chain master link tool as claimed in claim 1, wherein the first and second levers are pivotal to a collapsed position in which the first working portions are adjacent to each other, the second working portions are adjacent to each other, and the first and second working portions orientate in a same direction.

4. The chain master link tool as claimed in claim 3, wherein the first lever includes two receiving portions for receiving the master link, with the master link including one pin inserted in one of the two receiving portions and another pin inserted in the other of the two receiving portions.

5. The chain master link tool as claimed in claim 4, wherein the second lever includes a retaining portion for receiving a chain link, wherein the chain link is configured to facilitate connection of the master link with the roller chain assembly, wherein the chain link is movable between a use position and a stowed position, wherein the chain link in the use position is disengaged from the retaining portion, and wherein the chain link in the stowed position is engaged with the retaining portion releasably.

6. The chain master link tool as claimed in claim 1, wherein the first inner peripheral walls of the first and second levers are concaved.

7. The chain master link tool as claimed in claim 1, wherein each of the first and second levers includes a limiting portion selectively engagable and disengagable from each other, wherein when the first and second levers pivot with respect to each other, the limiting portions disengage from each other, and wherein when the first and second levers are inhibited from pivoting with each other, the limiting portions engage with each other releasably.

8. The chain master link tool as claimed in claim 1, wherein the first lever includes two receiving portions for receiving the master link, with the master link including one pin inserted in one of the two receiving portions and another pin inserted in the other of the two receiving portions.

9. The chain master link tool as claimed in claim 1, wherein the second lever includes a retaining portion for receiving a chain link, wherein the chain link is configured to facilitate connection of the master link with the roller chain assembly, wherein the chain link is movable between a use position and a stowed position, wherein the chain link in the use position is disengaged from the retaining portion, and wherein the chain link in the stowed position is engaged with the retaining portion releasably.

10. The chain master link tool as claimed in claim 1, wherein the first lever has an end shaped like a chisel and defining a tire lever end for removing a tire from a rim, and wherein the second lever has an end shaped like a chisel and defining a tire levering portion for removing a tire from a rim.

11. The chain master link tool as claimed in claim 1, wherein each of the first and second levers has a front side and a back side and includes a connecting portion on the back side, and wherein the connecting portions of the first and second levers are pivotally engaged with each other releasably.

* * * * *